United States Patent
Ayala et al.

(10) Patent No.: US 10,059,193 B2
(45) Date of Patent: Aug. 28, 2018

(54) GRILLE FOR A VEHICLE, IN PARTICULAR A COMMERCIAL VEHICLE AS WELL AS A VEHICLE

(71) Applicant: Daimler AG, Stuttgart (DE)

(72) Inventors: Ray Ayala, Foxboro, MA (US); Dinesh Madugundi, Beaverton, OR (US); Donald Vena, Vancouver, WA (US); Rafael Dos Santos, Portland, OR (US); Michael Gatza, Happy Valley, OR (US); Michael Norlin, Portland, OR (US); Ryan Geary, Portland, OR (US); Georgeanna Alemany, Clackamas, OR (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 15/520,754

(22) PCT Filed: Oct. 14, 2015

(86) PCT No.: PCT/EP2015/002026
§ 371 (c)(1),
(2) Date: Apr. 20, 2017

(87) PCT Pub. No.: WO2016/062382
PCT Pub. Date: Apr. 28, 2016

(65) Prior Publication Data
US 2017/0326969 A1    Nov. 16, 2017

(30) Foreign Application Priority Data
Oct. 21, 2014   (GB) .................................. 1418700.9

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01)

(58) Field of Classification Search
CPC ....... B60K 11/085; B60K 11/04; B60K 11/08; B60R 19/52; B60R 2019/525
See application file for complete search history.

(56) References Cited

U.S. PATENT DOCUMENTS 3,232,368 A * 2/1966 Sullivan ................... B60H 3/06
                                                    180/68.3
4,457,558 A * 7/1984 Ishikawa .............. B60K 11/085
                                                    123/41.05

(Continued)

FOREIGN PATENT DOCUMENTS

DE    10 2008 049 228 A1    6/2010
DE    10 2009 052 372 A1    5/2011

(Continued)

OTHER PUBLICATIONS

PCT/EP2015/002026, International Search Report dated Jan. 29, 2016 (Three (3) pages).

*Primary Examiner* — Jacob B Meyer
(74) *Attorney, Agent, or Firm* — Crowell & Moring LLP (57) ABSTRACT

A grille for a vehicle is disclosed. The grille is configured to be arranged in front of at least one heat exchanger of the vehicle and includes a plurality of grille bars arranged at a distance from one other. A respective portion of each of the plurality of grille bars is airfoil-shaped.

5 Claims, 6 Drawing Sheets (56) References Cited

U.S. PATENT DOCUMENTS

| | | | | |
|---|---|---|---|---|
| 4,753,288 A * | 6/1988 | Harvey | B60K 11/085 123/41.04 |
| 4,938,303 A * | 7/1990 | Schaal | B60H 1/3227 123/41.48 |
| 4,957,325 A * | 9/1990 | Engel | B62D 35/001 296/180.2 |
| 4,971,172 A * | 11/1990 | Hoffman | B60K 13/02 180/68.3 |
| 5,054,567 A * | 10/1991 | Hoffman | B60K 11/00 180/68.2 |
| 5,490,574 A * | 2/1996 | Ishiizumi | B60K 11/08 180/68.1 |
| 6,230,832 B1 * | 5/2001 | von Mayenburg | B60K 11/08 180/68.1 |
| 6,854,544 B2 * | 2/2005 | Vide | B60K 11/085 180/68.1 |
| 7,766,111 B2 * | 8/2010 | Guilfoyle | B60K 11/04 180/68.1 |
| 8,091,516 B2 * | 1/2012 | Preiss | B60K 11/04 123/41.05 |
| 8,292,014 B2 * | 10/2012 | Sugiyama | B60K 11/085 123/41.06 |
| 8,347,994 B2 * | 1/2013 | Bering | B60K 11/08 180/68.1 |
| 8,485,296 B2 * | 7/2013 | Charnesky | B60K 11/085 165/98 |
| 8,505,660 B2 * | 8/2013 | Fenchak | B60K 11/085 180/68.1 |
| 8,517,130 B2 * | 8/2013 | Sakai | B60K 11/085 180/68.1 |
| 8,556,013 B2 * | 10/2013 | Sturmon | B60K 11/08 180/68.1 |
| 8,807,166 B2 * | 8/2014 | Charnesky | B60K 11/085 137/601.08 |
| 8,887,849 B2 * | 11/2014 | Hite | E05D 5/0207 180/69.2 |
| 8,892,314 B2 * | 11/2014 | Charnesky | B60K 11/085 180/68.1 |
| D803,101 S * | 11/2017 | Ito | B60K 11/08 D12/93 |
| 2003/0029581 A1 * | 2/2003 | Vide | B60K 11/085 160/201 |
| 2003/0047365 A1 * | 3/2003 | Jain | B60K 11/08 180/68.1 |
| 2004/0216934 A1 * | 11/2004 | Tomiyama | B60K 11/04 180/68.1 |
| 2005/0211487 A1 * | 9/2005 | Obe | B60K 11/08 180/69.21 |
| 2009/0266312 A1 * | 10/2009 | Preiss | B60K 11/04 123/41.05 |
| 2010/0071977 A1 * | 3/2010 | Ritz | B60K 11/085 180/68.1 |
| 2010/0243351 A1 * | 9/2010 | Sakai | B60K 11/085 180/68.1 |
| 2010/0282533 A1 * | 11/2010 | Sugiyama | B60K 11/085 180/68.1 |
| 2011/0062750 A1 * | 3/2011 | Nakaura | B60K 11/08 296/187.09 |
| 2011/0073288 A1 * | 3/2011 | Hirukawa | B60K 11/08 165/104.34 |
| 2012/0067655 A1 * | 3/2012 | Charnesky | B60K 11/085 180/68.1 |
| 2012/0074729 A1 * | 3/2012 | Fenchak | B60K 11/085 296/193.1 |
| 2012/0090906 A1 * | 4/2012 | Charnesky | B60K 11/085 180/68.1 |
| 2012/0110909 A1 * | 5/2012 | Crane | B60K 11/085 49/70 |
| 2012/0186890 A1 * | 7/2012 | Hori | B60K 11/085 180/68.3 |
| 2012/0305818 A1 * | 12/2012 | Charnesky | B60K 11/085 251/212 |
| 2012/0312611 A1 * | 12/2012 | Van Buren | B60K 11/085 180/68.1 |
| 2012/0323448 A1 * | 12/2012 | Charnesky | B60K 11/085 701/49 |
| 2013/0081888 A1 * | 4/2013 | Charnesky | B60K 11/04 180/68.3 |
| 2013/0223980 A1 * | 8/2013 | Pastrick | B60K 11/085 415/1 |
| 2013/0248265 A1 * | 9/2013 | Wolf | B60K 11/085 180/68.1 |
| 2014/0370795 A1 * | 12/2014 | Klop | B60H 1/242 454/75 |
| 2015/0159541 A1 * | 6/2015 | Solazzo | B60K 11/085 73/114.68 |
| 2016/0280168 A1 * | 9/2016 | Klop | B60R 13/06 |
| 2017/0050510 A1 * | 2/2017 | Manhire | B60K 11/085 |
| 2017/0072786 A1 * | 3/2017 | Kurokawa | B60K 13/04 |
| 2017/0080794 A1 * | 3/2017 | Yamamoto | B60K 11/04 |
| 2017/0326969 A1 * | 11/2017 | Ayala | B60K 11/085 |

FOREIGN PATENT DOCUMENTS

| | | |
|---|---|---|
| DE | 10 2011 102 155 A1 | 11/2012 |
| DE | 10 2012 104 722 A1 | 12/2012 |
| FR | 1 045 729 A | 12/1953 |
| GB | 2520626 A * | 5/2015 ........... B60K 11/085 |
| JP | 2007-320527 A | 12/2007 |
| WO | WO 2013/126764 A1 | 8/2013 |
| WO | WO 2014/064083 A1 | 5/2014 |

* cited by examiner

GRILLE FOR A VEHICLE, IN PARTICULAR A COMMERCIAL VEHICLE AS WELL AS A VEHICLE

BACKGROUND AND SUMMARY OF THE INVENTION

The invention relates to a grille as well as a vehicle, in particular a commercial vehicle.

Vehicles comprising grilles are well-known from the general prior art. Such a grille is also referred to as a "radiator grille" and configured to be arranged in front of at least one heat exchanger of the vehicle. For example, the grille is configured to be arranged at least partially in a through opening through which air can flow due to a forward movement of the vehicle. In other words, the grille can provide airflow so that air can flow against and around the heat exchanger arranged behind the grill with respect to the longitudinal direction of the vehicle.

For example, the heat exchanger serves to cool a fluid due to a heat transfer from the fluid via the heat exchanger to the air flowing around the heat exchanger. This means the fluid can flow through the heat exchanger thereby transferring heat via the heat exchanger to the air flowing around the heat exchanger.

The fluid can be configured as a liquid or a gas. For example, the fluid is a coolant used to cool an engine of the vehicle. Alternatively or additionally, the coolant can be used to cool at least one electrical component of the vehicle. Moreover, the fluid can be a refrigerant used by an air conditioning system to cool air to be guided into an interior of the vehicle. The grille comprises a plurality of grille bars arranged at a distance from one another.

DE 10 2008 049 228 A1 shows a radiator grille arrangement for a motor vehicle at the front end of a motor vehicle which comprises a plurality of air passage openings which can be closed at least substantially by at least one flap element. The at least one flap element is supported in such a way that the flap element is able to swivel about an associated flap axis. In driving states of the motor vehicle in which little cooling air is needed for the engine or engine compartment, the entire flap arrangement or a part of the flap arrangement can be closed in order to improve the drag coefficient of the motor vehicle and to save fuel.

DE 10 2009 052 372 A1 shows a radiator grille arrangement for a passenger car, the radiator grille arrangement having a radiator grille comprising multiple air inlet openings, and a flap arrangement including flap elements which are moveable between a closing position and an opening position.

The air inlet openings can be closed and/or opened by the flap elements. The flap elements are supported by a radiator grille-sided holding unit in a pivotable manner around a pivot axis relative to the radiator grille. A control device is at least indirectly held on the radiator grille for pivoting the flap elements.

DE 10 2011 102 155 A1 shows a radiator grille module having a radiator grille provided with apertures for inflow of an airflow into a body space. Moreover, DE 10 2012 104 722 A1 shows an actuator for closing, opening and moving horizontal plates and vertical plates arranged in air inlet openings.

It is an object of the present invention to provide a grille of the aforementioned kind, by means of which particularly advantageous aerodynamics of the vehicle can be realized.

It is a further object of the present invention to provide a vehicle having particularly good aerodynamics.

In order to provide a grille by means of which grille particularly advantageous aerodynamics of the vehicle can be realized, according to the present invention at least a portion of the respective grille bar is airfoil-shaped. In other words, the grille bars each comprise at least a portion which has the shape of an airfoil, wherein air can flow around the respective airfoil-shaped portion due to a forward movement of the vehicle. Thereby, the air flowing around the portions can be guided particularly advantageously so that the air can flow against and around at least one heat exchanger in a particularly advantageous way. Preferably, at least a respective major portion of the respective grille bar is airfoil-shaped.

The invention also relates to a vehicle comprising a grille according to the invention, the grille being arranged in front of the at least one heat exchanger. Advantageous embodiments of the grille according to the present invention are to be regarded as advantageous embodiments of the vehicle according to the present invention and vice versa.

The advantages offered by the invention are increased aerodynamic efficiency, and subsequent improvements in fuel economy and operating costs. Additional improvements include reduced wind noise and improved soiling.

Further advantages, features, and details of the invention derive from the following description of a preferred embodiment as well as from the drawings. The features and feature combinations previously mentioned in the description as well as the features and feature combinations mentioned in the following description of the figures and/or shown in the figures alone can be employed not only in the respective indicated combination but also in any other combination or taken alone without leaving the scope of the invention.

DETAILED DESCRIPTION OF THE DRAWINGS

In the figures the same element or elements having the same functions are indicated with the same reference sign.

Figure 1:
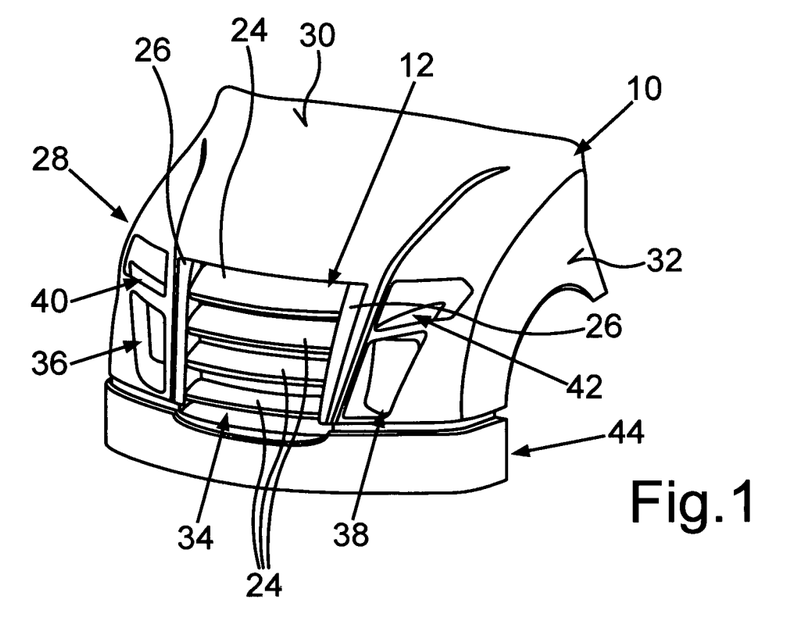
FIG. 1 is a schematic perspective view of an engine hood and a grille for a commercial vehicle, the grille being arranged in front of a heat exchanger unit of the vehicle and comprising a plurality of grille bars arranged at a distance from one another, wherein at least a portion of the respective grille bars are airfoil-shaped.
Figure 2:
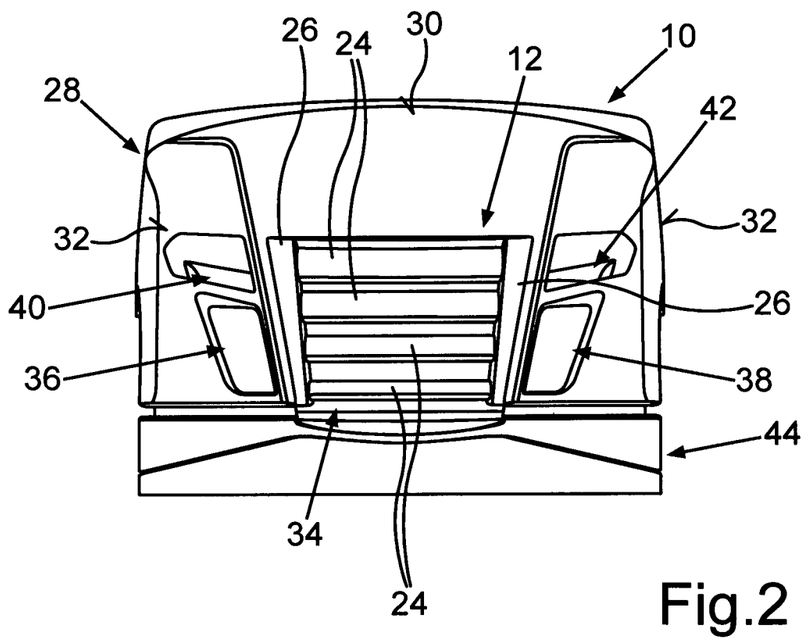
FIG. 2 is a schematic front view of the engine hood and the grille.

FIG. 1 shows an engine hood 10 for a vehicle in the form of a commercial vehicle, in particular a truck. The truck can be seen in FIGS. 8 to 12 and is designated by 46. The truck 46 comprises a driver's cab 48 and an engine compartment arranged in front of the driver's cab 48 with respect to the longitudinal direction of the vehicle. The engine compartment is covered by the engine hood 10 at least partially. The truck 46 also comprises an engine arranged in the engine compartment, the engine serving to drive the truck 46. For example, the engine is configured as an internal combustion engine.

Figure 6:
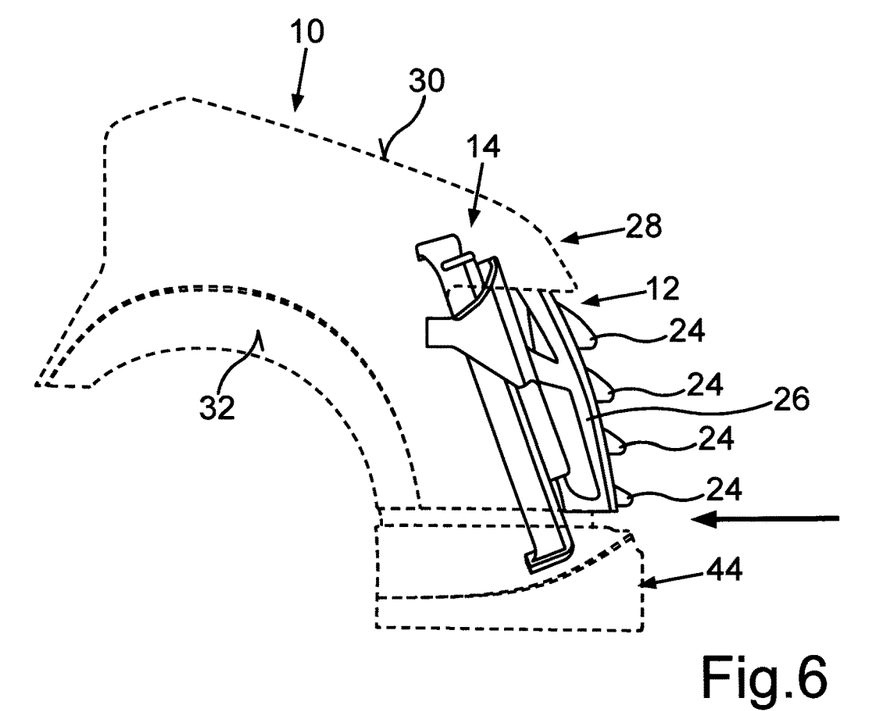
FIG. 6 is a schematic side view of the engine hood, the grille, and the heat exchanger unit, wherein the engine hood is shown in a transparent manner.
Figure 7:
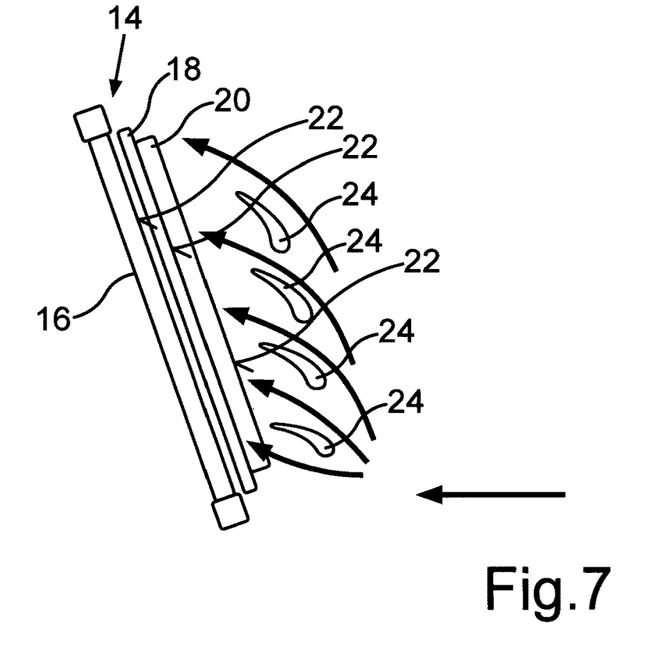
FIG. 7 is a schematic sectional view of the heat exchanger unit and the grille bars.

Moreover, FIG. 1 shows a grille 12 of the truck 46, the grille 12 being also referred to as a "radiator grille". As can be seen in FIGS. 6 and 7, the grille 12 is arranged in front of a heat exchanger unit 14 of the truck, the heat exchanger unit 14 comprising a plurality of heat exchangers 16, 18 and 20. The heat exchangers 16, 18 and 20 overlap each other and serve to cool a fluid flowing through the heat exchangers 16, 18, 20 respectively. The heat exchangers 16, 18, 20 are also referred to as "primary heat exchangers" and serve to cool, for example, at least one component of a power train and/or at least one electrical component of the truck 46. Alternatively or additionally, at least one of the heat exchangers 16, 18, 20 can be part of an air conditioning system configured to supply the interior of the driver's cab 48 with cooled air. The respective fluid flowing through the heat exchangers 16, 18 and 20 respectively can be cooled by a heat transfer from the fluid via the respective heat exchanger 16, 18 and 20 to air flowing against and around the heat exchangers 16, 18 and 20.

In FIGS. 6 and 7, air flowing against and around the heat exchanger unit 14 is illustrated by directional arrows. This airflow is effected by a forward movement of the truck 46. In other words, air flows around the grille 12 and against and around the primary heat exchangers when the truck 46 moves forward.

The engine hood 10 and the grille 12 are highly engineered to realize particularly advantageous aerodynamics and, thus, to improve the aerodynamic efficiency of the truck. Though highly modified, the engine hood's 10 and the grille's 12 exterior retains the same basic layout as a traditional heavy duty truck, and thus the same terms can be used to refer to the engine hood 10, the grille 12 and/or body panels of the truck.

The primary heat exchangers form a bank of heat exchangers, the bank of heat exchangers being centrally located at the front of the truck 46 underneath the engine hood 10, but not directly attached to the engine hood 10. This location is traditionally where a vehicle's heat exchangers for power train, electrical, and climate control cooling systems are located.

To balance the cooling requirements necessary for the truck's operation with that of the exterior shape necessary to realize advantageous aerodynamics, the bank of heat exchangers is engineered so that it may be installed at an angle in relation to the longitudinal direction of the vehicle. In other words, the heat exchangers 16, 18 and 20 each have a front surface 22 against which the air flows due to the forward movement of the truck 46, the respective front surface 22 extending in an imaginary plane extending diagonally to the longitudinal direction of the vehicle. The active grille may be equally applicable for a vertically mounted heat exchanger or heat exchangers.

As can be seen from FIGS. 6 and 7, the respective heat exchangers 16, 18 and 20, in particular the respective front surfaces 22 ascend in the longitudinal direction of the vehicle from the front towards the rear of the truck. Typically, heat exchangers are installed in such a way that the respective front surface 22 extends perpendicularly to the longitudinal direction of the vehicle. In other words, usually, heat exchangers are installed in a vertical manner. By arranging the heat exchangers 16, 18 and 20 in such a way that the respective front surface 22 extends angularly in relation to the longitudinal direction of the vehicle, particularly advantageous aerodynamics of the truck 46 can be realized.

As can be seen from FIGS. 1, 2, 6 and 7, the grille 12 comprises a plurality of grille bars 24 substantially extending in the transverse direction of the vehicle. The grille bars 24 are arranged at a distance from one another and on top of each other in relation to the vertical direction of the vehicle. The grille 12 further comprises lateral mounting elements 26 on which the grille bars 24 are mounted. For example, the grille 12 is attached to the engine hood 10 by the mounting elements 26.

The engine hood 10 is engineered such that, as one assembly, it is responsible for performing multiple functions integral to the truck's operation. The engine hood 10 comprises highly engineered external and interior surfaces that are assembled together in order to form one integrated hood assembly. The engine hood 10 can be formed in one piece. The engine hood 10 is engineered to manage both internal and external airflows around and within the truck's exterior surface to optimize both aerodynamic and cooling system performance. The exterior of the engine hood 10 is engineered with a priority placed on aerodynamic and cooling system airflow optimization. Its external surfaces are engineered to aerodynamically guide external airflow over and around its external surfaces through the use of optimal radii and continuous surfaces where the traditional facets of the hood come together, i.e.: front of hood, to upper hood, to side fender surfaces, to cowl, to rain tray area. The end result is a continuous external surface with little to no surface transitions that may disturb the airflow.

The engine hood 10 comprises a front surface 28 which is also referred to as a "leading surface" of the engine hood 10. The leading surface of the engine hood 10 guides oncoming airflow both up and over its surface onto an upper surface 30 of the engine hood 10 as well as around and to the sides of its surface onto side surfaces 32 of the engine hood 10. Additionally, the leading surface guides oncoming airflow into airflow inlets 34, 36, 38, 40 and 42 of the engine hood 10. In other words, the inlets 34, 36, 38, 40 and 42 are through openings through which air can flow due to, for example, a forward movement of the truck 46.

The engine hood 10 is engineered with the air inlet 34 centrally located on the leading surface, the air inlet 34 providing airflow to the primary heat exchangers. This inlet 34 is also referred to as a "primary cooling air inlet" since it allows air flowing against and around the primary heat exchangers. As can be seen from FIGS. 1 and 2, the grille 12, in particular the grille bars 24 are arranged in the air inlet 34. The primary cooling air inlet (air inlet 34) positively mates with at least one duct not shown in FIGS. 1 and 2, the duct feeding air to the primary heat exchangers.

The grille 12 is a multi-bar grille assembly that is engineered to provide optimal airflow distribution to main cooling openings of the primary heat exchangers. The multi-bar grille assembly, i.e., the grille 12, is installed onto the engine hood 10 and functions as an integral part of the primary cooling air inlet.

Figure 3:
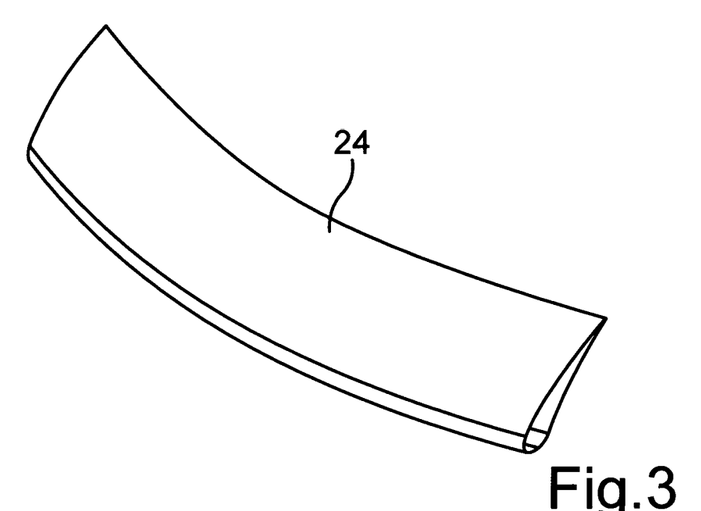
FIG. 3 is a schematic perspective view of one of the grille bars.
Figure 4:
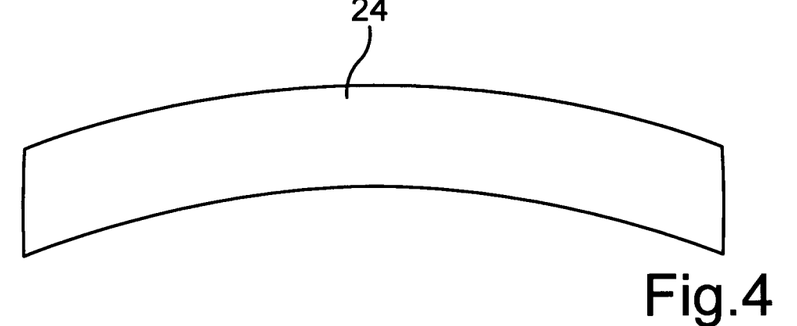
FIG. 4 is a schematic top view of the grille bar according to FIG. 3.
Figure 5:
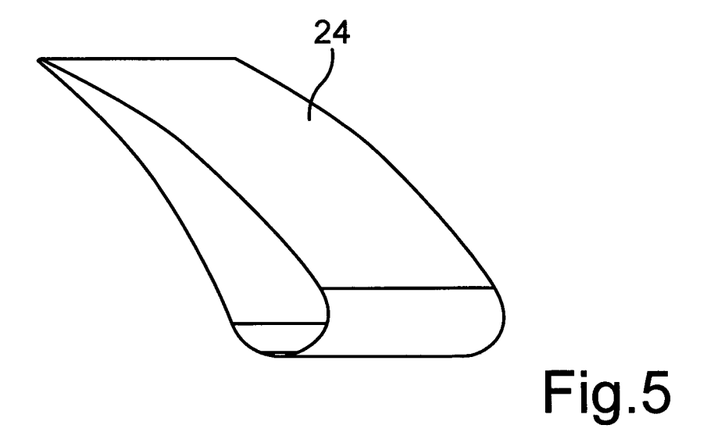
FIG. 5 is a schematic side view of the grille bar according to FIGS. 3 and 4.

As can be seen from FIGS. 3, 4 and 5, the respective grille bar 24 is airfoil-shaped in order to realize particularly advantageous aerodynamics of the truck. The grille bars 24 are designed to close off and make continuous the hood 10 surface (or A-surface) to minimize any geometry interference to the flow as the flow is directed around the grille 12 away from the stagnation region. Minimal geometry interference on high speed flow is crucial in achieving low drag. The gaps between the grille bars 24 are optimized to allow sufficient cooling air flow at highway speeds or when cruise control is activated, with the lowest grille bar 24 always kept open. In high horsepower conditions the grille bars will rotate to the open position to maximize airflow through the heat exchangers to provide maximum cooling performance and minimum fan ON events where the grille bars 24 are shaped like an airfoil with varying orientation from top to bottom as shown in FIG. 7. The grille bars' orientation increases by 10° from vertical, per each grille bar 24 and in a graduated manner, from top to bottom. The grille bars' airfoil shape and orientation achieve minimal pressure drop across the grille 12 improving cooling air flow and homogenous distribution of flow on the heat exchangers 16, 18 and 20. In other words, the grille bars 24 are airfoil-shaped in order to provide an efficient turning vane that guides the oncoming air from its oncoming velocity to one that is, preferably, at least substantially perpendicular to the main cooling openings and, thus, the front surfaces 22 with little to no pressure drop. In other words, the oncoming air is guided by the grill bars 24 in such a way that the air flows at least substantially perpendicularly to the respective imaginary plane in which the respective front surface 22 is arranged.

Additionally, the grille 12 can be engineered such that the grille bars 24 are moveable in both height and angle in order to optimize the relationship between cooling and aerodynamics of the truck, either independently or dependently, in either a passive or active manner, controlled either manually or automatically.

This means the grille bars 24 are pivotable about a pivot axis in relation to the mounting elements 26 in such a way that an angle between the longitudinal direction of the vehicle and the grille bars 24 can be adjusted. The grille bars 24 can be adjusted, for example, manually. Alternatively, at least one actuator, in particular an electrical or electro-pneumatic actuator can be provided by means of which the grille bars 24 can be pivoted. For example, the grille bars 24 can be pivoted independently or dependently.

Moreover, the grille bars 24 can be translationally moveable in relation to each other in such a way that the distance between the grille bars 24 can be adjusted with respect to the vertical direction of the vehicle.

The airflow's path to and through the heat exchanger 16, 18 and 20 is as follows: the air flows over a bumper 44 (FIG. 1) and onto the engine hood 10, where it is guided towards the primary cooling inlet (air inlet 34). As the air encounters the grille bars 24 and the grille assembly, the direction of the airflow changes as it flows over the airfoil-shaped grille bars 24. After flowing over the grille bars 24, the air continues to flow a short distance through the duct positively mating with the primary cooling air inlet. The airflow then encounters the bank of heat exchangers (heat exchanger unit 14), which it flows through to enable the heat exchange that allows the truck systems to be cooled. After exiting the bank of heat exchangers, the air flows through a fan shroud, past a fan of the truck 46 and out into the underhood area.

Figure 8:
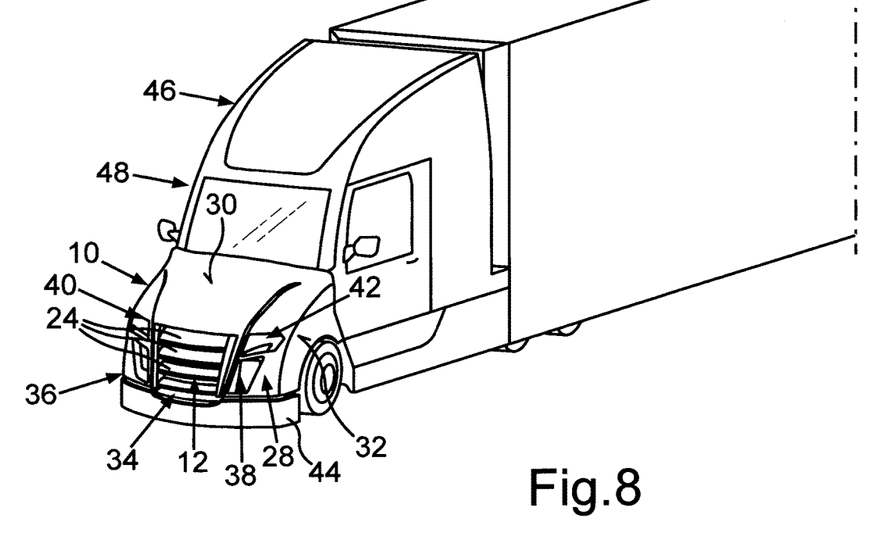
FIG. 8 is part of a schematic perspective view of the commercial vehicle, wherein the grille is closed.
Figure 9:
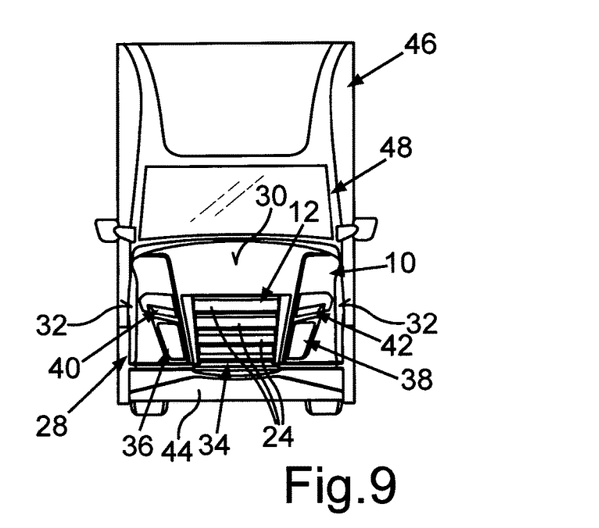
FIG. 9 is a schematic front view of the commercial vehicle, wherein the grille is closed.
Figure 10:
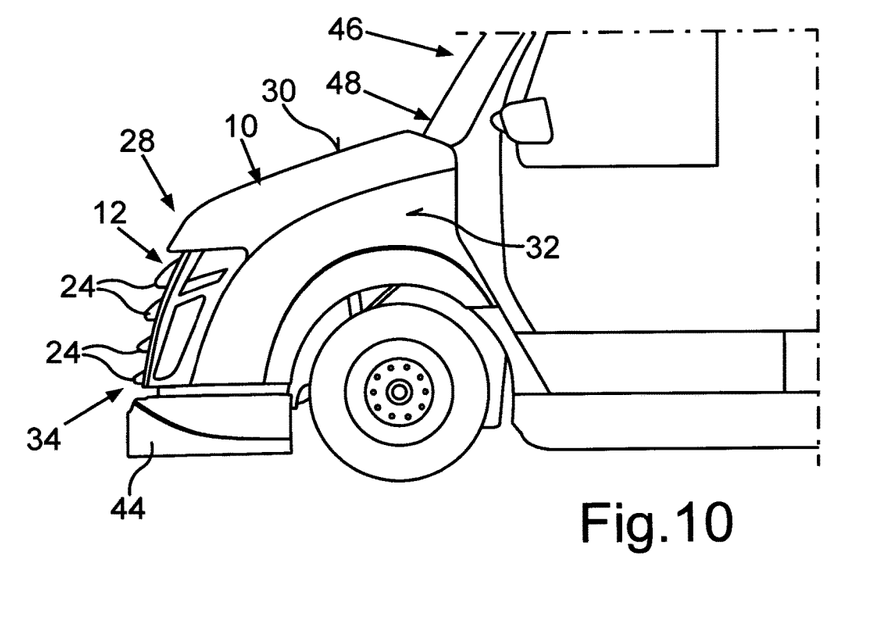
FIG. 10 is part of a schematic side view of the commercial vehicle, wherein the grille is open.
Figure 11:
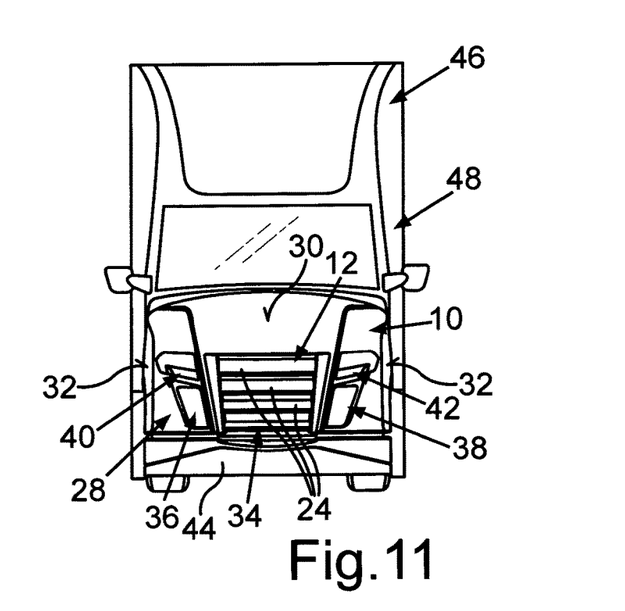
FIG. 11 is a schematic front view of the commercial vehicle, wherein the grille is open.
Figure 12:
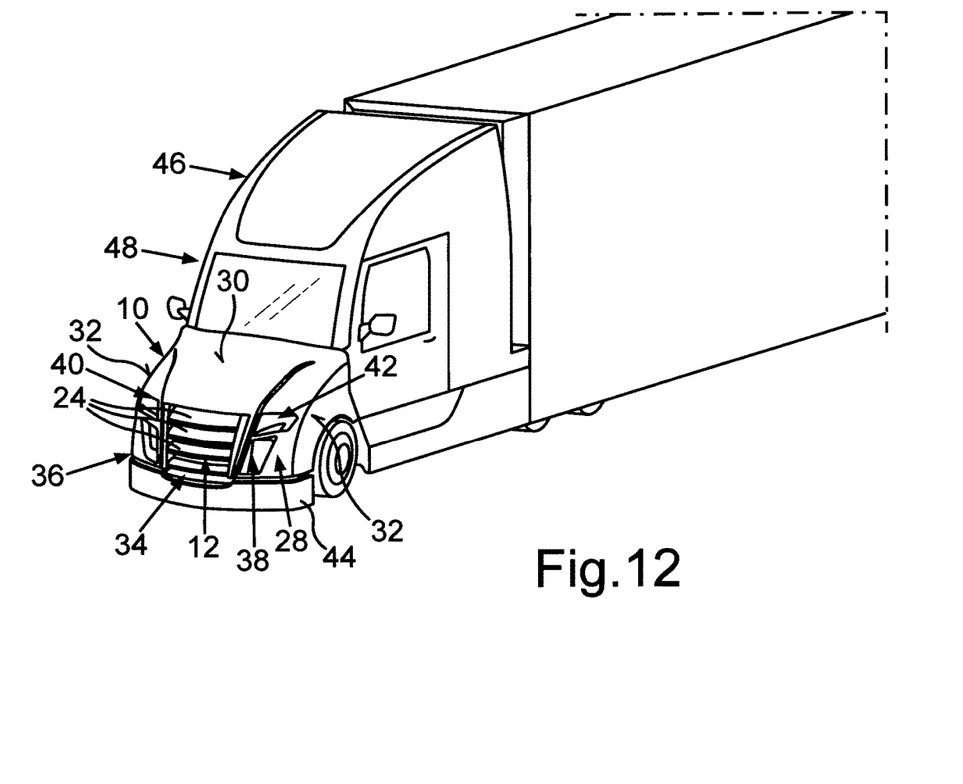
FIG. 12 is part of a schematic perspective view of the commercial vehicle, wherein the grille is open.

FIG. 8 shows the truck 46 in a schematic perspective view, wherein the grille 12, i.e., the grill bars 24, are closed. FIG. 9 shows the truck 46 in a schematic front view, wherein the grille 12 is closed. FIGS. 10 to 12 show the truck 46 with the grille 12 being open so that air can flow through the air inlet 32.

The invention claimed is:

1. A vehicle, comprising:
   an engine hood, wherein the engine hood defines a primary cooling air inlet on a leading surface of the engine hood;
   at least one heat exchanger, wherein the at least one heat exchanger has a front surface against which air is flowable due to a forward movement of the vehicle and wherein the front surface extends in a plane extending diagonally to a longitudinal direction of the vehicle; and
   a grille with a plurality of grille bars, wherein the plurality of grille bars are disposed at a distance from one another, wherein a respective portion of each of the plurality of grille bars is airfoil-shaped, wherein the grille is installed onto the engine hood at the leading surface and functions as an integral part of the primary cooling air inlet and is disposed in front of the at least one heat exchanger, wherein, in a closed position, the plurality of grille bars create a continuous surface with the engine hood, and wherein, in an open position, the plurality of grille bars guide the air such that the air flows substantially perpendicularly to the plane extending diagonally to the longitudinal direction of the vehicle.

2. The vehicle according to claim 1, wherein the plurality of grille bars are configured to guide the air such that a flow of the air is homogenously distributed on the at least one heat exchanger.

3. The vehicle according to claim 1, wherein at least one of the plurality of grille bars is pivotable about a pivot axis such that an angle between the longitudinal direction of the vehicle and the at least one of the plurality of grille bars is adjustable.

4. The vehicle according to claim 1, wherein the plurality of grille bars are disposed on top of each other in relation to a vertical direction of the vehicle.

5. The vehicle according to claim 1, wherein the plurality of grille bars are pivotable in a graduated manner.

* * * * *

UNITED STATES PATENT AND TRADEMARK OFFICE
CERTIFICATE OF CORRECTION

| | | |
|---|---|---|
| PATENT NO. | : 10,059,193 B2 | Page 1 of 1 |
| APPLICATION NO. | : 15/520754 | |
| DATED | : August 28, 2018 | |
| INVENTOR(S) | : Ray Ayala et al. | |

It is certified that error appears in the above-identified patent and that said Letters Patent is hereby corrected as shown below:

In the Specification

In the first Line please insert:
--This invention was made with government support under DE-EE0003348 awarded by the U.S. Department of Energy. The government has certain rights in the invention.--

Signed and Sealed this
Twenty-second Day of October, 2024

Katherine Kelly Vidal
*Director of the United States Patent and Trademark Office*